United States Patent
Blach (10) Patent No.: US 7,654,726 B2
(45) Date of Patent: Feb. 2, 2010

(54) MULTI-SHAFT EXTRUDER

(76) Inventor: Josef A. Blach, Hoher Steg 10, 74348 Lauffen (DE)

( * ) Notice: Subject to any disclaimer, the term of this patent is extended or adjusted under 35 U.S.C. 154(b) by 611 days.

(21) Appl. No.: 10/553,046

(22) PCT Filed: Mar. 19, 2004

(86) PCT No.: PCT/EP2004/002867

§ 371 (c)(1),
(2), (4) Date: Jul. 31, 2006

(87) PCT Pub. No.: WO2004/091889

PCT Pub. Date: Oct. 28, 2004

(65) Prior Publication Data

US 2007/0121421 A1     May 31, 2007

(30) Foreign Application Priority Data

Apr. 15, 2003   (DE) .................. 103 17 357

(51) Int. Cl.
*B29B 7/48* (2006.01)
(52) U.S. Cl. ......................... 366/85; 425/204
(58) Field of Classification Search .................. 366/85, 366/301; 425/204
See application file for complete search history.

(56) References Cited

U.S. PATENT DOCUMENTS

| | | | | |
|---|---|---|---|---|
| 1,356,296 A | * | 10/1920 | La Casse | .................. 366/76.4 |
| 2,942,294 A | * | 6/1960 | Reifenhauser | .............. 425/204 |
| 4,889,430 A | * | 12/1989 | Mueller | ........................ 366/85 |
| 5,836,682 A | | 11/1998 | Blach | |
| 6,196,711 B1 | | 3/2001 | Blach et al. | |
| 7,040,798 B2 | | 5/2006 | Innerebner et al. | |
| 2004/0094862 A1 | | 5/2004 | Sturm et al. | |

FOREIGN PATENT DOCUMENTS

| | | |
|---|---|---|
| DE | 3712749 C1 | 4/1987 |
| DE | 4433487 A1 | 3/1996 |
| DE | 19807089 | 8/1999 |
| DE | 10211673 A1 | 9/2003 |
| EP | 0 788 867 B1 | 1/1997 |
| EP | 0 995 566 B1 | 11/1998 |
| GB | 2 204 524 A | 11/1988 |
| WO | WO 97/31767 A2 | 9/1997 |
| WO | WO 02/30652 A1 | 4/2002 |
| WO | WO 02/38359 A1 | 5/2002 |

OTHER PUBLICATIONS

International Search Report dated Jul. 13, 2004 (3 pages).
Handbuch der Kunststoff-Extrusionstechnik, U. Burkhardt, et al., 1989, Carl Hanser Verlag Muenchen Wien, pp. 548-551.

* cited by examiner

*Primary Examiner*—David L Sorkin
(74) *Attorney, Agent, or Firm*—Flynn, Thiel, Boutell & Tanis, P.C.

(57) ABSTRACT

A multiple-shaft extruder comprises a core (4) with outward leading channels that can be flown through by a cooling liquid. At least two housing segments (16 to 19) are each provided with a cooling circuit with interconnected cooling bore holes (28), which can be flown through by a cooling liquid, are distributed in the peripheral direction and in an axially parallel manner, and which are located on the section of the housing segments (16 to 19) that faces the process chamber (2).

21 Claims, 7 Drawing Sheets

Flange A
Cross-Section A-B

Fig. 8

Cross-Section C-D

Cooling Bores

Cross-Section A-B

Fig. 9

Flange B
Cross-Section C-D

MULTI-SHAFT EXTRUDER

This invention relates to an extruder according to the preamble of claim 1.

Such extruders are known (EP 0788867 B1; EP 0995566 B1). The housing is divided into segments. The segments can be provided e.g. with material feed openings, gas outlet openings, heating means, cooling elements and the like to permit the extruder to be adapted flexibly to the material processing to be carried out in the particular case.

Compared to a double-shaft extruder, such multi-shaft extruders with annularly disposed shafts have the advantage of having twice as many wedges on which material is processed particularly effectively by being transferred from the processing elements of one screw to the next. For example, an extruder with twelve shafts has 24 wedges, i.e. each shaft has two wedges associated therewith, while a double-shaft extruder has only two wedges, i.e. each shaft has only one wedge associated therewith. Being the effective processing zone, each wedge has heat produced thereon by additional stretching and compressing of the product. The high number of wedges thus leads in multi-shaft extruders to an increased accumulation of heat, which increases the temperature of the material to such an extent that the material can be overstressed. It is therefore known from WO 02/30652 A1 to form the housing in one piece and provide circumferentially distributed, axially parallel bores as cooling channels not only in the housing but also in the core.

The problem of the invention is to ensure an optimal temperature for processing in the process chamber of a multi-shaft extruder having a housing constructed of segments, and a material temperature as low as possible upon discharge from the process chamber.

This is achieved according to the invention by the extruder characterized in claim 1. The subclaims render advantageous embodiments of the inventive extruder.

The inventive extruder has a core provided with cooling channels through which cooling liquid flows to ensure a heat exchange in the process chamber from the inside and cool it. At least one, but preferably two or more, segments of the housing are provided with circumferentially distributed, axially parallel cooling bores which are interconnected, each segment being provided with a connection for a cooling liquid feed and a connection for a cooling liquid drain through which cooling liquid is supplied to the cooling bores and discharged therefrom. The cooling bores are disposed on the portion of the segment facing the process chamber and thus as near as possible to the process chamber.

The housing segment provided with the cooling bores has at the same time a heating means on the outside circumference. Each housing segment provided both with cooling bores and with a heating means preferably has a control device which controls both the heating means and the flow of cooling liquid through the cooling bores to permit adjustment of an optimal processing temperature and a material temperature as low as possible. The cooling liquid flow through the cooling bores can be controlled with a valve in the cooling liquid feed or drain. The temperature control device has a temperature sensor which is provided in the housing segment to determine the temperature in the process chamber. The heating means is used to heat the housing segment in question when the extruder is started to adjust the predefined operating temperature in the process chamber. If the operating temperature is exceeded during extrusion, the temperature control device switches the heating means off and cooling liquid is supplied to the cooling bores in the housing segment, controlled by the temperature control device, to maintain the predefined operating temperature pattern and control the heat removal differently from zone to zone. The housing generally consists of at least three housing segments, whereby preferably all, but in any case the majority, of the housing segments are adapted to be coolable and heatable in this way.

The core assumes the temperature near the product from the process section and is therefore—unless an internal axial heat exchange takes place—near room temperature at the upstream conveying end and near the higher product outlet temperature at the downstream conveying end. By intensification of the axial heat transport with a corresponding choice of materials and their design or e.g. with the help of a viscous heat carrier, the product temperature can be lowered on the outlet side, on the one hand, and increased to the point of equalization in the direction of product feed, on the other hand. If a heat surplus is still present, it must be dissipated to the outside by the coolant, which can alternatively be effected at each end of the process section.

The cooling channels of the core are preferably formed by an axial bore and an outside channel disposed spirally around the axial bore and extending near the process chamber. Both the axial bore and the spiral outside channel extend over the total, or at least most of, the process chamber and preferably serve to adjust a low material outlet temperature.

The cooling liquid flows via a cooling liquid feed at the upstream conveying end of the core, which is adjacent the drive for the shafts, into the axial bore in the core and then in the conveying direction of the extruder to the downstream conveying end portion of the core, where the product outlet openings are located. The downstream conveying end of the axial bore is connected to the downstream conveying end of the spiral outside channel, causing cooling liquid in the spiral outside channel to flow back to the cooling liquid drain at the upstream conveying end of the extruder in countercurrent to the conveying direction of the shafts.

The process chamber of the extruder is preferably sealed with end plates on the downstream and upstream conveying ends. While the extrusion die is attached to the downstream conveying end plate, the upstream conveying end plate is preferably penetrated by the core, the cooling liquid feed and cooling liquid drain to and from the cooling channels in the core being provided on the end portion of the core protruding from the upstream conveying end plate.

The core could be executed in one piece for non-wearing products, but as a rule it consists of a hollow drilled mandrel containing a well-fitting distributor on whose surface the desired cooling channel pattern is incorporated preferably in a spiral shape. The mandrel bears segments positioned in rotationally fast fashion whose outer form again partly encloses the axially parallel screws with little play.

For connecting the cooling liquid feed and drain, an annular segment is disposed on the upstream conveying end of the core, which protrudes from the upstream conveying end plate, said segment being provided with radial bores for connection to the axial bore and the outside channel. The annular segment with the radial bores can be formed as a plate through which the shafts for the drive extend.

The outside channel is preferably formed by a spiral groove on the outside circumference of the distributor, which is sealed from the process chamber by the mandrel. The radial bores for connecting the cooling liquid feed and drain are guided through the mandrel.

The mandrel preferably has sleeve-shaped segments disposed thereon in rotationally fast fashion e.g. by splining with the mandrel so as to form the axially parallel, circular segment shaped recesses. Since the sleeve-shaped segments are usually exposed to different wear on the inner side of the process chamber, they can thus be selectively replaced.

The housing segments can partly have radially extending openings for connecting the process chamber to the outer surroundings in order to supply substances to the process chamber or remove them therefrom, for example gases. The openings preferably extend horizontally, thus being disposed on the side of the housing, or vertically, i.e. upward or downward. The openings can be provided with fixed fittings, for example a funnel, or movable fittings, for example a screw conveyor. They can also be sealed when they are not needed.

The housing segments can be interconnected by flanges. However, they are preferably held together tightly by tie-rods with prestressing. At least three tie-rods offset at an angle of 120° are preferably provided to obtain high contact pressure on the entire circumference between the segments. Because of the vertically and horizontally extending openings in the housing segment, however, four tie-rods are preferably used which are offset by 45° from the horizontal or vertical.

The tie-rods extend through axially parallel bores in the housing segments and thus at the same time serve to mutually position the housing segments radially. The tie-rods can also have a smaller diameter than the bores in the housing segments through which they are guided. To ensure the mutual radial positioning of the housing segments, a plurality of sleeve-shaped filler pieces are then slipped successively on the tie-rods. The sleeve-shaped filler pieces have the advantage that the housing segments can be removed singly upon dismantling of the housing, so that the housing does not fall apart as a whole when the pull rods are drawn out.

The pull rods preferably attack at one end the downstream conveying housing segment and at the other end an annular plate provided on the downstream conveying side of the material feed opening. Said plate can be used to fasten the extruder to a machine frame. Thus the torque and tractive forces occurring in the housing during processing of the material are transmitted via this plate into the machine frame so as to bypass the housing segment with the material feed opening. Thus the housing segment with the material feed opening is not attacked by any appreciable axial or torsional forces. It can thus consist of two axially spaced plates between which a thin wall, for example made of sheet metal, is detachably fastened. This permits fast thorough cleaning of the screw elements on the shafts in the feed area, since the material which is still powdery in this area is frequently deposited firmly on the screws.

The segment with the material feed opening is preferably followed on the downstream conveying side by a segment with a funnel-shaped inside wall tapering in the downstream conveying direction. Said funnel-shaped feed segment causes a ring of material to form around the shaft, which leads to uniform material distribution in the process chamber. The funnel-shaped feed segment can extend into the plate which is attacked by the pull rods at their ends.

While the segmented housing and the core are fixed relative to each other radially and in the circumferential direction, the housing is formed to be axially movable relative to the core in order to compensate temperature differences between housing and core. For this purpose the housing can be mounted so as to be axially displaceable on the core on the upstream conveying side of the material feed opening.

The housing segments between the plate which is supported on the machine frame, and the downstream conveying end plate usually consist of long and short segments. The long segments are provided with the heating means and with the cooling bores. The short segments serve primarily to feed and remove substances and are therefore provided with openings for connecting the process chamber to the outer surroundings.

As mentioned at the outset, the higher energy conversion in the wedge is fundamentally advantageous for uniform and intensive processing of the product. Particularly high pressure is often necessary for pressing the fully processed substance through a perforated plate, screen or the like at the product discharge. Because of the subsequently often relatively long residence time during shaping, the product temperature must be as low as possible. Since the wedge makes an essential contribution only to homogenization but not to pressure buildup, it is not absolutely necessary for the discharge area according to the invention. Since only the suitable screws are guided as single-shaft or twin screws up to the end of the housing and the others end before the discharge area, this finding is easy to utilize. A twelve-shaft extruder has twelve engagement zones and thus twenty-four wedges. If every third screw shaft, i.e. altogether four screws, end before the discharge area, four twin screws with four engagement zones or eight wedges result. If every second screw, i.e. six, end before the discharge area, six single-shaft screws remain up to the end of the housing, and the engagement zones or wedges are completely eliminated. This does not result in a reduction of delivery volume since the strand cross sections and likewise the number of strands remain unchanged. For example, a twelve-shaft ring extruder equipped with double-threaded screws divides the product into twelve strands of material, the same as a twin screw divides it into three strands of material, and a single-shaft extruder into two strands of material. With four twin screws and six single-shaft extruders there are always twelve strands of material which, while the product is in the process section, are divided up as in the twelve-shaft extruder. Under the same operating conditions, the lowest material outlet temperature is obtained substantially in the single-shaft extruder, and the highest in the twelve-shaft extruder.

Since the shafts ending before the discharge segment are exposed to lower pressure, more economical axial bearings can also be used for said shafts.

Hereinafter an embodiment of the inventive extruder will be explained more precisely by way of example with reference to the drawing, in which.

Figure 1:
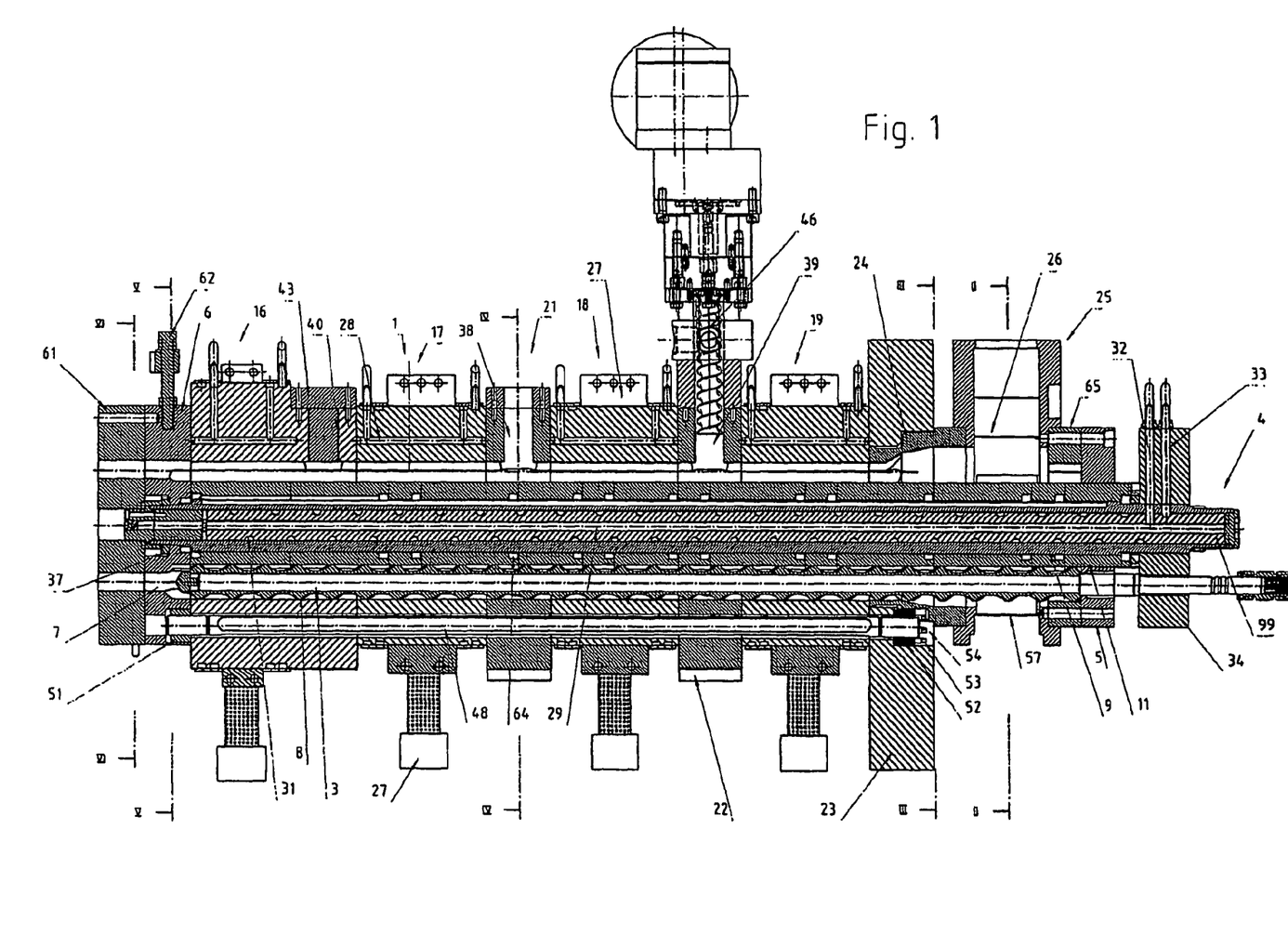
FIG. 1 shows a longitudinal section through the extruder.
Figure 2:
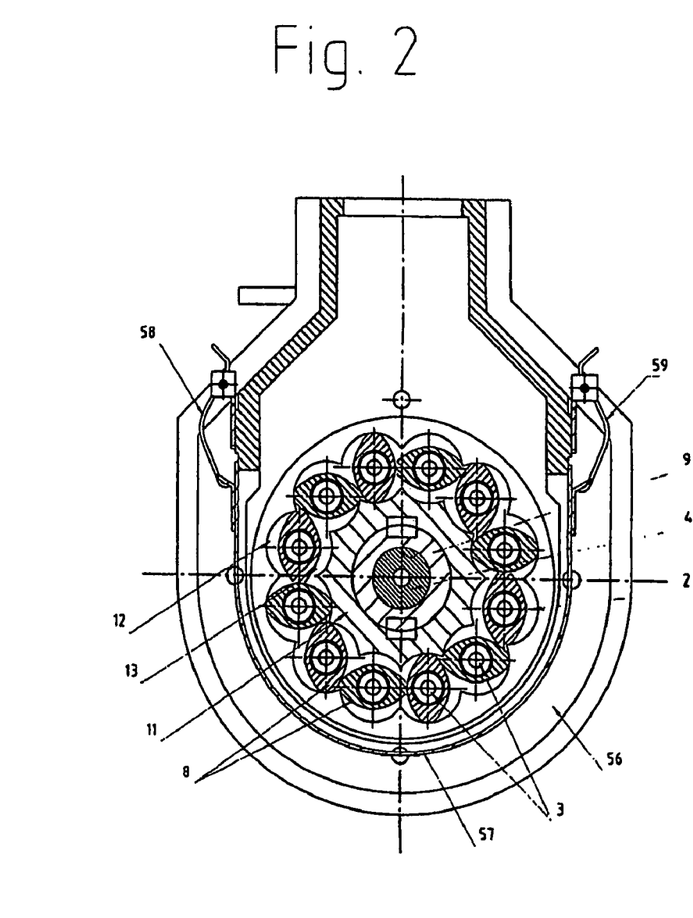
FIGS. 2 to 6 show cross sections along the lines II-II, III-III, IV-IV, V-V and VI-VI.
Figure 3:
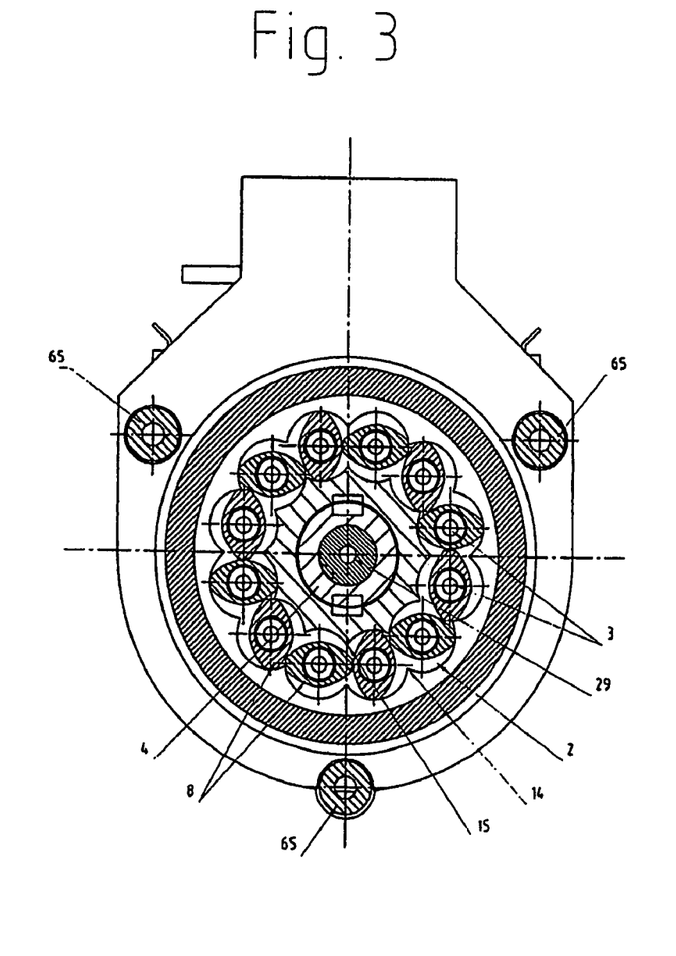
Figure 4:
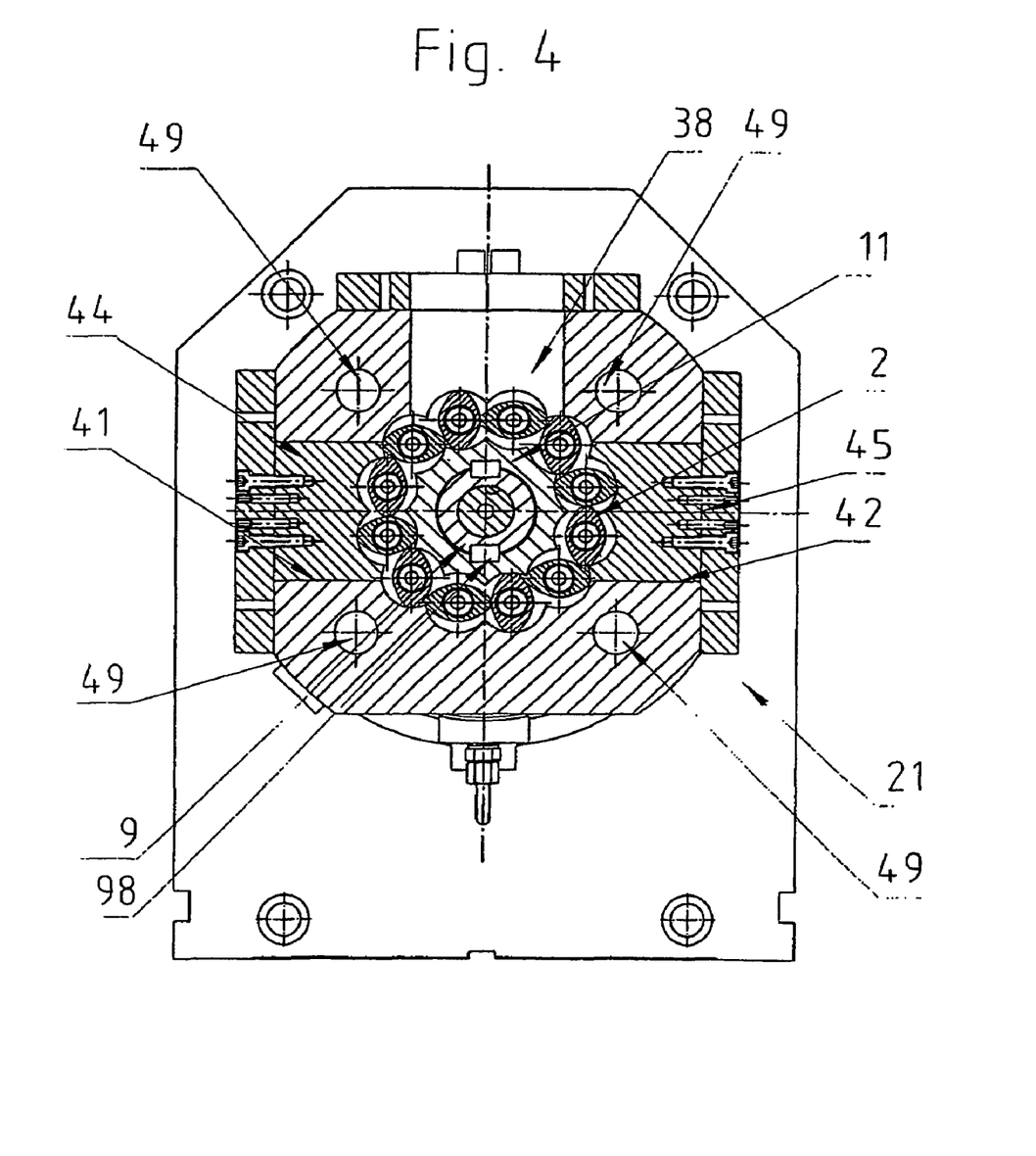

According to FIG. 1 and FIGS. 2 to 4, the extruder has in a housing 1 a process chamber 2 which extends along a circle (FIGS. 2 to 4). A plurality of axially parallel shafts 3 are disposed in the process chamber 2. The chamber 2 extends between the housing 1 and an axial core 4.

The process chamber 2 is sealed on both faces by end plates 5, 6. The shafts 3 extend through the upstream conveying end plate 5, being driven codirectionally by a drive section not shown in the drawing. The material outlet openings 7 are provided in the downstream conveying end plate 6.

A plurality of screw or similar processing elements 8 are disposed in rotationally fast fashion on each shaft 3. According to FIGS. 2 to 4, the screw elements 8 of adjacent shafts 3 mesh with little play, i.e. largely tightly.

The housing 1 is provided on its inner side with axially parallel, concave, circular segment shaped longitudinal depressions 12, while the segments 11 of the core 4 likewise have accordingly formed axially parallel, concave, circular segment shaped longitudinal depressions 13. The longitudinal depressions 12, 13 which the screw elements 8 engage with little play, i.e. largely tightly, serve to mount and guide the shafts 3. Between two adjacent longitudinal depressions 12; 13 on the inner side of the housing 1 and the outer side of the segments 11, wedges 14, 15 are formed on which the material to be extruded is transferred from the processing elements 8 of one shaft 3 to the next shaft 3.

The housing 1 is composed of a plurality of longer annular housing segments 16 to 19 and shorter annular housing segments 21, 22 disposed therebetween. The upstream conveying housing segment 19 is followed by an annular plate 23 which is mounted on a machine frame not shown.

The plate 23 has protruding thereinto a feed segment 24 with an inside wall tapering in a funnel shape on the downstream conveying side. This is followed on the upstream conveying side by a filler housing segment 25 with a material feed opening 26 and the end plate 5 fastened thereto. The filler housing 25 has on the underside a cleaning opening which can be opened in readily accessible fashion with a cover 57.

The segments 16 to 19 are each provided on their outside circumference with electric heating means 27. Further, each housing segment 16 to 19 has on its portion facing the process chamber 2 circumferentially distributed, interconnected, axially parallel cooling bores 28 through which a coolant flows. To control the electric heating means 26 and the cooling circuit 28, each housing segment 16 to 19 has associated therewith a temperature control device not shown.

The core 4 is of coolable and preferably multisectional design. The hollow drilled mandrel 9 bears the segments 11 which are positioned in rotationally fast fashion via a keying. The mandrel 9 contains a well-fitting distributor 99 provided with an axial bore 29 and a spiral outside channel 31. At the upstream conveying end the distributor 99 is provided with a cooling liquid feed 32 to the axial bore 29 and a cooling liquid drain 33 from the outside channel 31.

The core 4 penetrates the upstream conveying end plate 5 so as to be axially freely displaceable and has on the free end an annular segment 34 which leads with a radial bore for the cooling liquid feed 32 to the axial bore 29, and the outside channel 31 to the cooling liquid drain 33.

The shorter segments 21 and 22 and the long downstream conveying segment 16 are provided with radial openings 38, 39, 40 extending vertically upward. Further, the segment 21 has two lateral, horizontally extending radial openings 41, 42 according to FIG. 4. The upwardly extending opening 40 in the segment 16 and the lateral openings 41, 42 in the segment 21 are sealed by stoppers 43, 44, 45. The opening 39 in the segment 22 is provided with a fitting 46 with a screw conveyor.

The housing segments 16 to 19, 21, 22 on the downstream conveying side of the plate 23 are held together tightly with prestressing by tie-rods 48. According to FIG. 4, four bores 49 are provided in the housing segments for receiving four tie-rods 48. The pull rods 48 attack at one end the downstream conveying housing segment 16 and at the other end the plate 23. For this purpose the downstream conveying end of the rod has screwed thereto a nut 51 which is supported on the housing segment 16. At the upstream conveying end the pull rods 48 have screwed thereto a further nut 52 in a recess in the plate 23, which is penetrated by clamp bolts 53 which are supported in the recess 54 on the plate 23.

Figure 5:
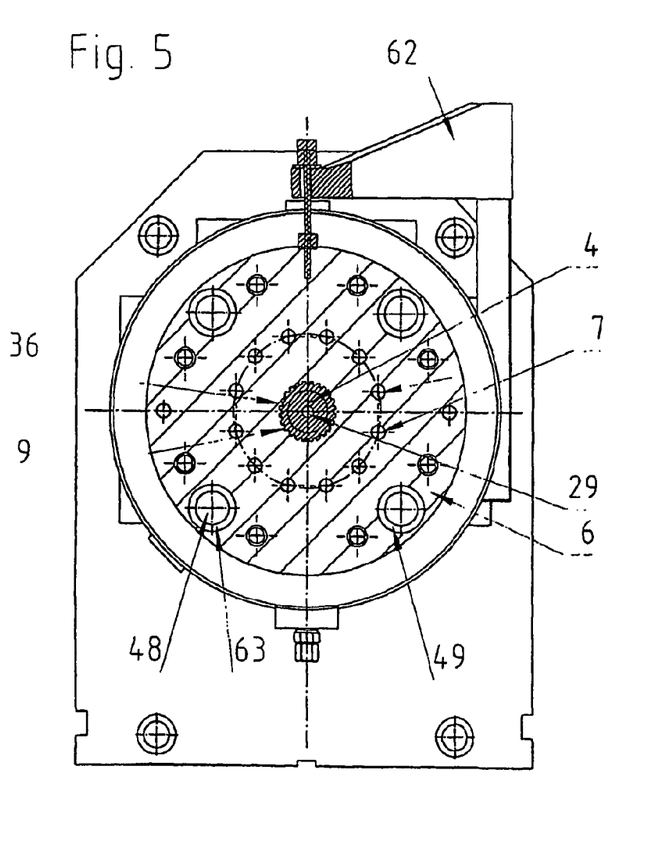
Figure 6:
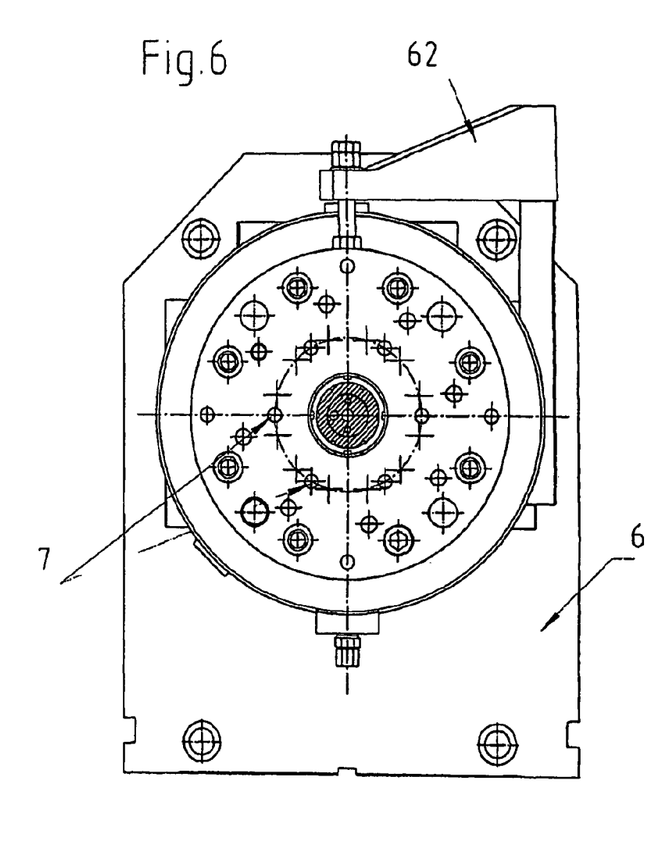

Fastened to the end plate 6 with the outlet openings 7 is a plate 61 which bears the extruder head not shown. Number 62 designates a suspension permitting the extruder head to be removed. The nuts 37 provided in the end plate 6 fix the core 4 relative to the housing 1 axially, radially and circumferentially. Screw bolts 65 are used to fasten the end plate 5, the filler housing 25 with the material feed opening 26 and the feed housing 24 with the funnel-shaped inside wall to the plate 23. Sleeve-shaped filler pieces 63 are slipped on the pull rods 48 (FIG. 5). The recesses 64 on the faces of the wearing segments 11 make it easier to remove the latter from the mandrel 9.

Figure 7:
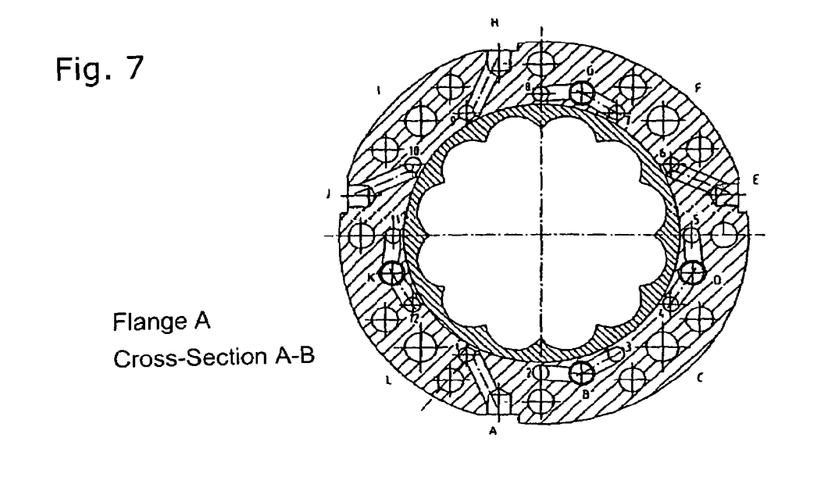
FIGS. 7 and 9 show cross sections through the housing segment in the flange.
Figure 8:
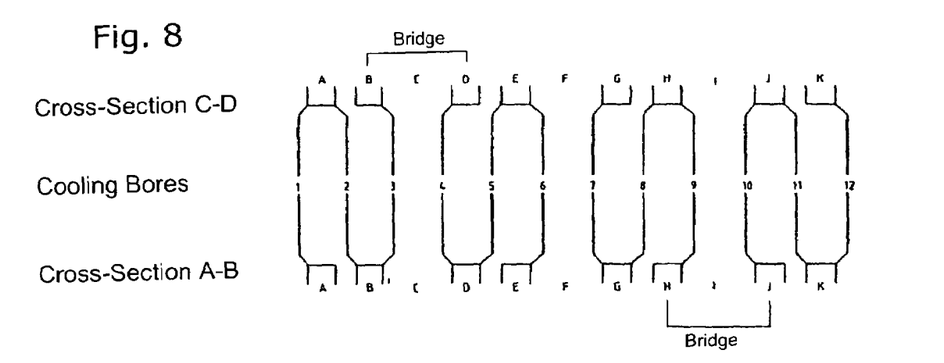
FIG. 8 shows a developed representation of the cooling channels of the housing segment according to FIGS. 7 and 9.
Figure 9:
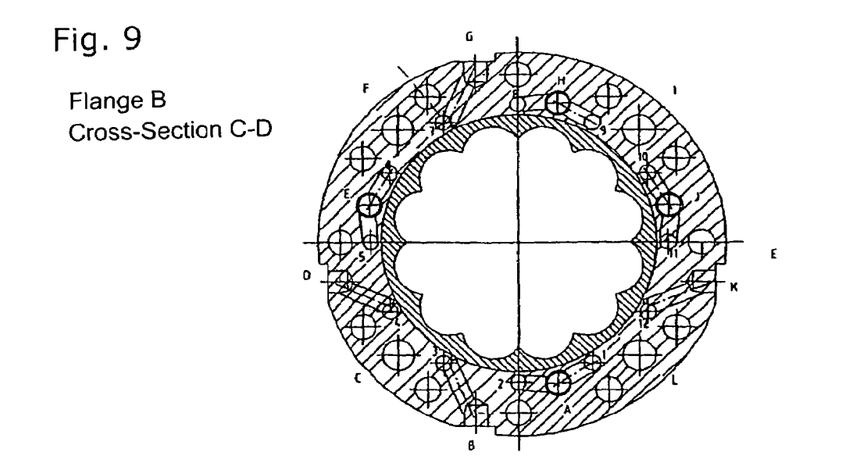

The housings 16 to 19 have separate cooling and heating circuits. FIGS. 7 and 9 show cross sections through one of said housings. The housing itself is shown for flange execution but it can also be executed with a solid outer cross section with tie-rods. A wear-resistant steel is characterized by great hardness and is therefore required on the product-wetted inner side of the housing. This material can either be produced by powder metallurgy and sinter-fused under pressure and temperature, or a separate inside body has been produced which is shrunk and/or bonded into the surrounding actual housing. The outer housing is a softer, tenacious and, according to the invention here, not necessarily weldable steel in which the axially parallel cooling bores 1 to 12 are incorporated. The bores C-F-I-L are provided for the dowel pins or the tie-rods and the frontal tapholes B-D-G-K are used for drilling the internal connections between two adjacent peripheral cooling bores 1-2, 5-6, 8-9 and 10-11. This results in four internally linked cooling circuits 1-2-3, 4-5-6, 7-8-9, 10-11-12 which are to be linked via outer connections, e.g. via the bridges B-C and H-J. The usual welding of the connections between the cooling bores 1 to 12 is only possible with separately produced inside bodies, since when an inner wearing layer is applied it would otherwise be partially destroyed and the whole housing rendered useless.

In the embodiment according to FIGS. 1 to 6, the discharge of the extruder is formed by the portion with the housing segment 16, whereby all twelve screws 3 (cf. FIG. 4) extend up to the end plate 6. In contrast, according to the embodiment of FIGS. 10 and 11, a special discharge segment 85 is provided, whereby two adjacent shafts 3 extend through corresponding bores in the discharge segment 85 up to the end plate 6, while the two adjacent shafts 3, one of which can be seen in FIG. 1, end at the discharge segment 85 as does the core 4. That is, every third one of the twelve shafts 3 according to FIG. 4 extends only up to the discharge segment 85. Thus, the twelve shafts 3 which the extruder has according to FIG. 4 form four double shafts 86 in the discharge segment 85, as evident from FIG. 11.

Figure 10:
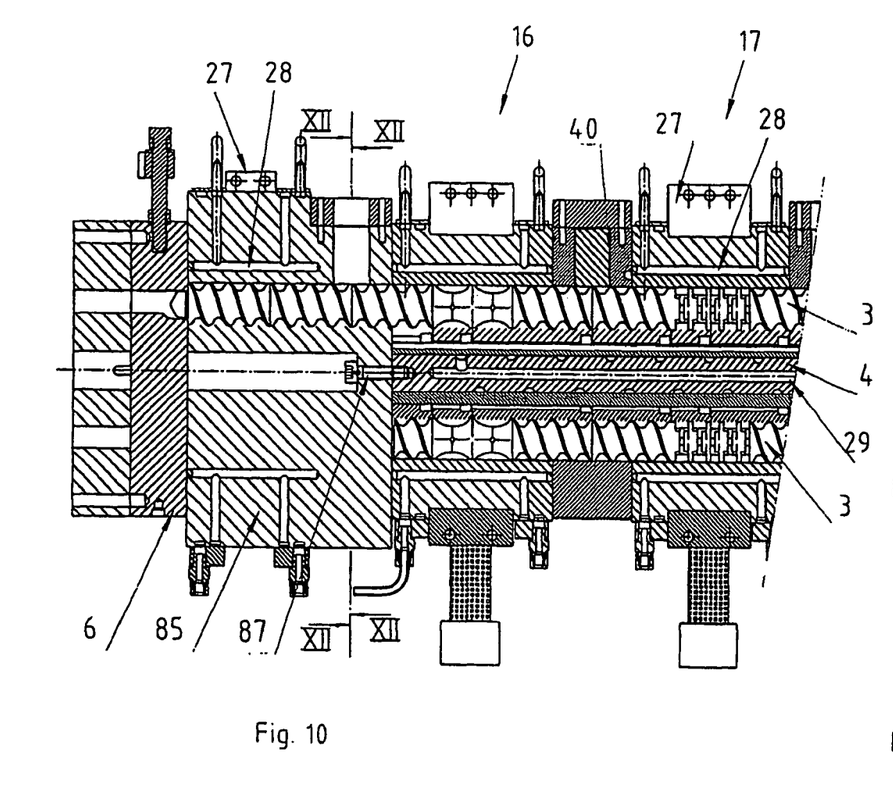
FIG. 10 shows a partial view of another embodiment of the extruder in longitudinal section.
Figure 11:
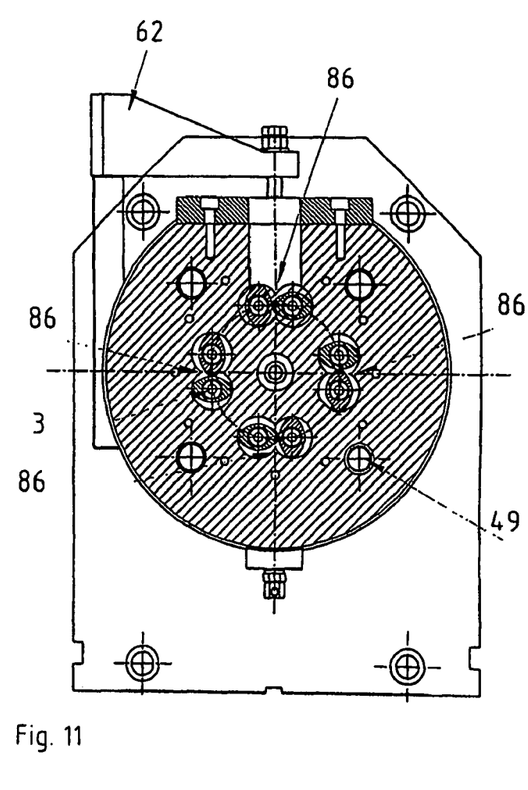
FIG. 11 shows a cross section along the line XII-XII in FIG. 10 as a twin screw discharge.

The core 4 is connected axially to the discharge segment 85 and fixed radially antirotationally with a screw 87. FIGS. 10 and 11 show the discharge segment 85 in one piece, but it can also be multisectional. For example, the core can also extend into or through the discharge segment 85.

The discharge segment 85 is provided with a heating means 27 on the outside circumference in the same way as the housing segments 16, 17, etc., and further with cooling bores 28 which are formed in the same way as the above-described cooling bores 28 in the housing segments 16 to 19.

Figure 12:
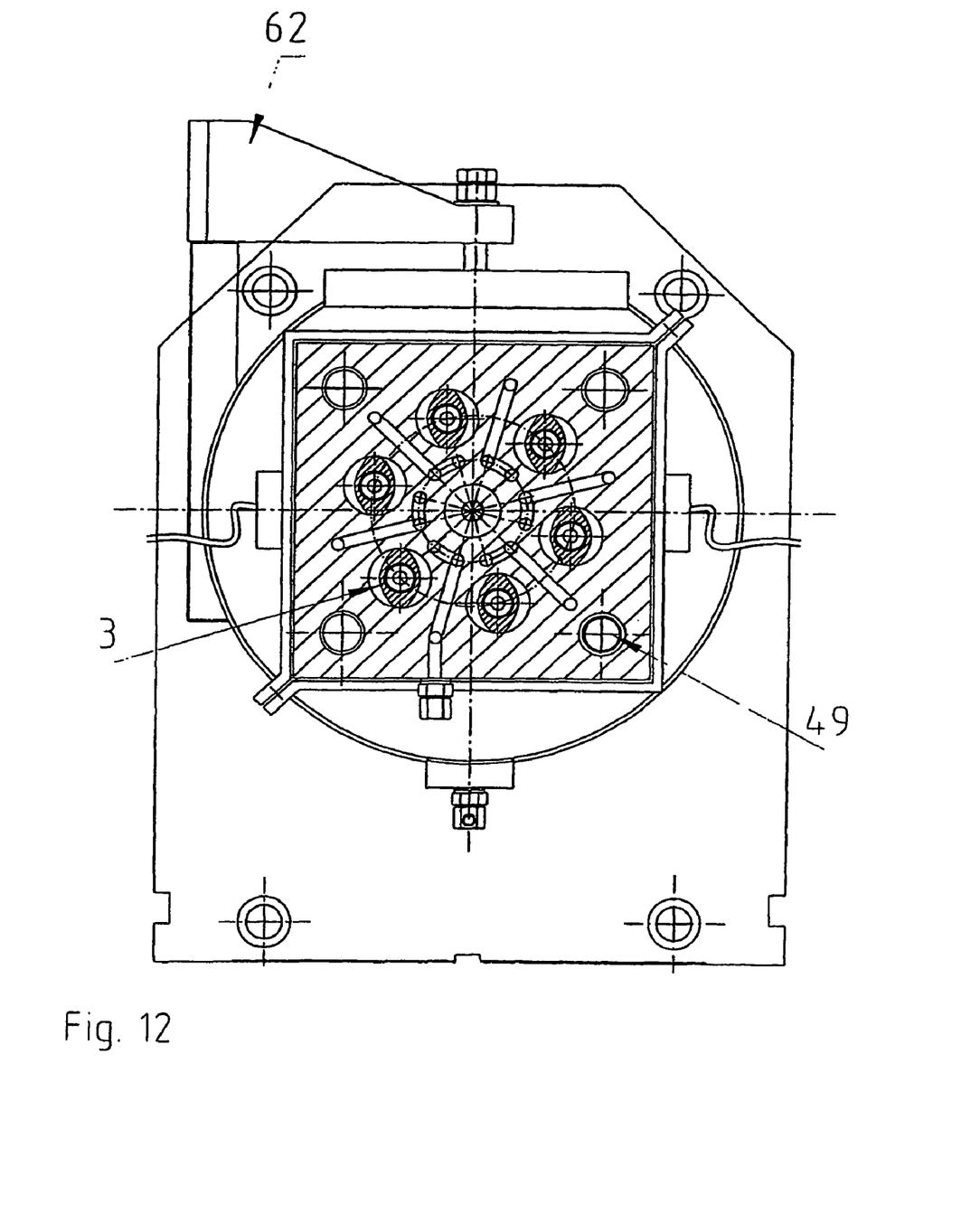
FIG. 12 shows a cross section corresponding to FIG. 11 for a single-shaft discharge.

The embodiment according to FIG. 12 differs from that according to FIG. 11 substantially in that the product discharge is not effected by four twin screws 86 but by six single screws 3, since every second single screw 3 ends before the discharge segment 85. It is also possible to provide both twin screws and single screws in the discharge segment 85.

The invention claimed is:

1. An extruder having a plurality of axially parallel, codirectionally rotating shafts disposed in a process chamber between a housing and a core along a circle at equal central-angle distance and equipped with processing elements with which adjacent shafts mesh with each other, whereby axially parallel, circular segment shaped longitudinal depressions are provided for receiving the shafts on the inner side of the housing and the outer side of the core, the housing is composed of housing segments, at least one of which is provided with a heating means, the housing segment at the upstream conveying end has a material feed opening and the discharge is provided at the downstream conveying end, characterized in that the core has outwardly leading cooling channels for a cooling liquid to flow through, said at least one housing segment provided with the heating means has a cooling circuit with axially parallel, circumferentially distributed, interconnected cooling bores for a cooling liquid to flow through on the portion of the housing segment facing the process chamber, and the at least one housing segment has associated therewith a temperature control device for controlling the heating means and the flow of cooling liquid through the cooling bores.

2. The extruder according to claim 1, characterized in that the cooling channels in the core are formed by an axial bore and an outside channel disposed spirally around the axial bore, and the coolant is supplied at the downstream conveying end and flows toward the upstream conveying end.

3. The extruder according to claim 2, characterized in that the outside channel is formed by a spiral groove on the outside circumference of a distributor and sealed by a mandrel.

4. The extruder according to claim 1, characterized in that the process chamber is sealed by end plates at the upstream and downstream conveying ends.

5. The extruder according to claim 4, characterized in that the core penetrates the upstream conveying end plate, and a cooling liquid feed and a cooling liquid drain are provided at the end of the core protruding from the upstream conveying end plate.

6. The extruder according to claim 5, characterized in that the cooling liquid feed and the cooling liquid drain are formed by radial bores in a segment which is disposed on the end of the core protruding from the upstream conveying end plate.

7. The extruder according to claim 1, characterized in that sleeve-shaped segments are disposed in an end plate so as to form the axially parallel, circular segment shaped longitudinal depressions.

8. The extruder according to claim 1, characterized in that at least one said housing segment has at least one horizontally and/or vertically extending, radial opening for connecting the process chamber to the outer surroundings.

9. The extruder according to claim 8, characterized in that the opening is provided with fixed or moving fittings for supplying or removing substances.

10. The extruder according to claim 1, characterized in that at least some of the housing segments are held together tightly by tie-rods with prestressing.

11. The extruder according to claim 10, characterized in that at least three said tie-rods are provided.

12. The extruder according to claim 10, characterized in that the radial positioning of the housing segments is effected by the tie-rods.

13. The extruder according to claim 10, characterized in that sleeve-shaped filler pieces are provided on the tie-rods.

14. The extruder according to claim 10, characterized in that the tie-rods attach at one end to the downstream conveying housing segment and at the other end to a plate provided on the downstream conveying side of the segment with the material feed opening.

15. The extruder according to claim 1, characterized in that the segment with the material feed opening is followed on the downstream conveying side by a segment with a funnel-shaped inside wall tapering in the downstream conveying direction.

16. The extruder according to claim 1, characterized in that the housing and the core are formed so as to be mutually movable axially on one side.

17. The extruder according to claim 1, characterized in that the discharge is formed by a discharge segment, whereby pairs of the adjacent shafts extend as double shafts into the discharge segment, and the two shafts adjacent the double shafts only extend up to the discharge segment.

18. The extruder according to claim 17, characterized in that the discharge segment is provided on the outside circumference with a heating means and/or cooling bores which correspond to the cooling bores of the housing segments.

19. The extruder according to claim 17, characterized in that the discharge segment is fastened to the core.

20. The extruder according to claim 1, characterized in that the discharge is formed by a discharge segment, whereby every second said shaft extends into the discharge segment, and the other shafts end at the discharge segment.

21. The extruder according to claim 1, characterized in that the at least one housing segment is formed on the inner side by a material produced by powder metallurgy and/or has a separate inside body.

* * * * *